US005822961A

United States Patent [19]

Busboom

[11] Patent Number: 5,822,961

[45] Date of Patent: Oct. 20, 1998

[54] QUICK ADJUSTMENT FOR STRAIGHT AHEAD TRAVEL FOR A WHEEL-STEERED LAWN MOWER

[75] Inventor: Garry W. Busboom, Beatrice, Nebr.

[73] Assignee: ExMark Mfg. Co., Inc., Beatrice, Nebr.

[21] Appl. No.: 821,115

[22] Filed: Mar. 20, 1997

[51] Int. Cl.[6] .................... A01D 69/00

[52] U.S. Cl. .................... 56/11.4; 56/10.8; 56/16.7; 56/13.5

[58] Field of Search .................... 56/10.5, 10.8, 56/10.9, 11.1, 11.2, 11.9, 13.5, 16.7, DIG. 11; 230/19.1

[56] References Cited

U.S. PATENT DOCUMENTS

| | | | |
|---|---|---|---|
| 2,711,624 | 6/1955 | Crump | 56/25.4 |
| 2,743,117 | 4/1956 | Hutchings | 280/456 |
| 3,283,486 | 11/1966 | Marek | 56/25.4 |
| 3,469,376 | 9/1969 | Bacon | 56/6 |
| 3,630,290 | 12/1971 | Williams et al. | 172/7 |
| 3,680,292 | 8/1972 | McCanse | 56/15.8 |
| 3,688,847 | 9/1972 | Deeter | 172/804 |
| 3,708,017 | 1/1973 | Alexandrovsky et al. | 172/239 |
| 3,795,094 | 3/1974 | Mollen et al. | 56/11.1 |
| 3,916,606 | 11/1975 | Brudnak, Jr. et al. | 56/13.4 |
| 3,983,943 | 10/1976 | Vander Lely | 172/70 |
| 4,019,755 | 4/1977 | Eisenhardt | 280/490 A |
| 4,055,036 | 10/1977 | Kidd | 56/13.6 |
| 4,154,455 | 5/1979 | Murphy | 280/461 A |
| 4,194,757 | 3/1980 | Lucas et al. | 280/461 A |
| 4,787,195 | 11/1988 | Wenzel | 56/11.1 |
| 4,897,987 | 2/1990 | Spalla | 56/16.7 |
| 4,920,734 | 5/1990 | Wenzel | 56/11.1 |
| 4,941,864 | 7/1990 | Bottum | 474/133 |
| 4,958,484 | 9/1990 | Busboom | 56/255 |
| 4,967,543 | 11/1990 | Scag | 56/10.8 |
| 5,035,108 | 7/1991 | Meyer et al. | 56/13.4 |
| 5,077,959 | 1/1992 | Wenzel | 56/11.1 |
| 5,127,215 | 7/1992 | Wenzel | 56/11.1 |
| 5,129,217 | 7/1992 | Loehr | 56/13.6 |
| 5,155,985 | 10/1992 | Oshima et al. | 56/10.8 |
| 5,209,307 | 5/1993 | Hotte | 172/445.2 |
| 5,239,810 | 8/1993 | Gugel | 56/10.8 |
| 5,249,411 | 10/1993 | Hake | 56/11.6 |
| 5,251,429 | 10/1993 | Minato et al. | 56/17.2 |
| 5,267,747 | 12/1993 | Thorn | 280/416.2 |
| 5,305,589 | 4/1994 | Rodriguez et al. | 56/320.1 |
| 5,337,543 | 8/1994 | Kitamura et al. | 56/10.8 |
| 5,346,018 | 9/1994 | Koster | 172/47 |
| 5,355,661 | 10/1994 | Tomiyama | 56/10.8 |
| 5,423,394 | 6/1995 | Kendle | 180/53.3 |
| 5,465,564 | 11/1995 | Koehn et al. | 56/320.2 |
| 5,507,138 | 4/1996 | Wright et al. | 56/14.7 |
| 5,518,079 | 5/1996 | Zvolanek | 180/19.1 |
| 5,538,264 | 7/1996 | Brown et al. | 280/6.1 |

OTHER PUBLICATIONS

Walker Mowers Brochure "Fast, Easy, Beautiful Mowing™" Dec. 1996.

Snapper Commercial Lawn & Turf Equipment Brochure Nov. 1994.

*Primary Examiner*—Terry Lee Melius
*Assistant Examiner*—Arpad Fabian Kovacs
*Attorney, Agent, or Firm*—Zarley, McKee, Thomte Voorhees & Sease; Dennis L. Thomte

[57] ABSTRACT

An apparatus is provided for quickly adjusting a dual hydraulically powered, wheel-steered lawn mower to achieve straight line travel when steered to the straight ahead position. Right and left hydraulic pump controls interconnect the speed control of the mower to right and left hydraulic pumps which are fluidly connected to right and left hydraulic motors which drive right and left drive wheels on the mower. The left hydraulic pump control is length adjustable and is maintained in a set position by a pair of jam nuts. The right hydraulic pump control also includes a length adjustable rod, but the same is length adjustable through the use of an adjustment knob which may be quickly adjusted while the mower is moving. The output of the right hydraulic pump may be adjusted by means of the right hydraulic pump control so that the output of the right hydraulic pump may be varied with respect to the left hydraulic pump so that the mower will move ahead in a straight line manner.

7 Claims, 5 Drawing Sheets

QUICK ADJUSTMENT FOR STRAIGHT AHEAD TRAVEL FOR A WHEEL-STEERED LAWN MOWER

BACKGROUND OF THE INVENTION

1. Field of the Invention

This invention relates to a means for quickly adjusting a dual hydraulically powered, wheel-steered lawn mower to achieve straight line travel when the mower is in the "straight ahead travel" position.

2. Description of the Related Art

Dual hydraulically powered, wheel-steered lawn mowers have independent drive systems connected to drive wheels on either side of the mower with the drive wheels being used to propel and steer the mower. The steering is accomplished by varying the speed between the two independent drive systems. During straight ahead travel, any difference in the speed of the drive systems will produce the undesirable result of the vehicle path deviating from true straight line travel. A differentiation in the speed between the two independent drive systems may occur in a number of different ways, including a change in one drive wheel diameter due to a reduction in air pressure in the pneumatic drive wheel. Further, a differentiation in speed may occur on side hills or the like.

SUMMARY OF THE INVENTION

A means is provided for quickly adjusting the output of one of the hydraulic pumps, relative to the other hydraulic pump, on a walk-behind lawn mower including a pair of hydraulic pumps which operate a pair of hydraulic motors which are connected to the drive wheels of the lawn mower. A hydraulic pump control mechanism or linkage is operatively connected to each of the hydraulic pumps for changing the pumping rate of the associated hydraulic pump. The hydraulic pump control mechanisms are operatively connected to a speed control crank arm to enable both of the hydraulic pump control mechanisms to be simultaneously moved to increase the speed of the hydraulic motors or to decrease the speed of the hydraulic motors. One of the hydraulic pump control mechanisms may be selectively adjusted through the use of tools for initially adjusting the pumping rate of the associated hydraulic pump. The other hydraulic pump control mechanism is also selectively adjustable to permit the initial adjustment of the associated hydraulic pump but is quickly selectively adjustable, while the mower is moving, without tools, to enable the associated hydraulic pump to be "finely" adjusted, with respect to the other hydraulic pump, so that the mower will track in a straight line.

It is therefore a principal object of the invention to provide a means for quickly adjusting a dual hydraulically powered, wheel-steered mower to achieve straight line travel when the mower is in the "straight ahead travel" mode.

Still another object of the invention is to provide a device of the type described which is adjustable without the need of tools.

Still another object of the invention is to provide a device of the type described wherein the necessary adjustment may be made while the mower is being operated.

Still another object of the invention is to provide a quick adjustment means for one of the hydraulic pumps of a dual hydraulic pump, dual hydraulic motor driven lawn mower so that the speed of the associated hydraulic motor may be adjusted, with respect to the other hydraulic motor, so that the mower will track in a straight line, even though one of the drive wheels may have a different diameter than the other drive wheel.

Yet another object of the invention is to provide a device of the type described which may be used in conjunction with steering controls normally associated with walk-behind, hydraulically driven mowers.

These and other objects will be apparent to those skilled in the art.

DESCRIPTION OF THE PREFERRED EMBODIMENT

Figure 1:
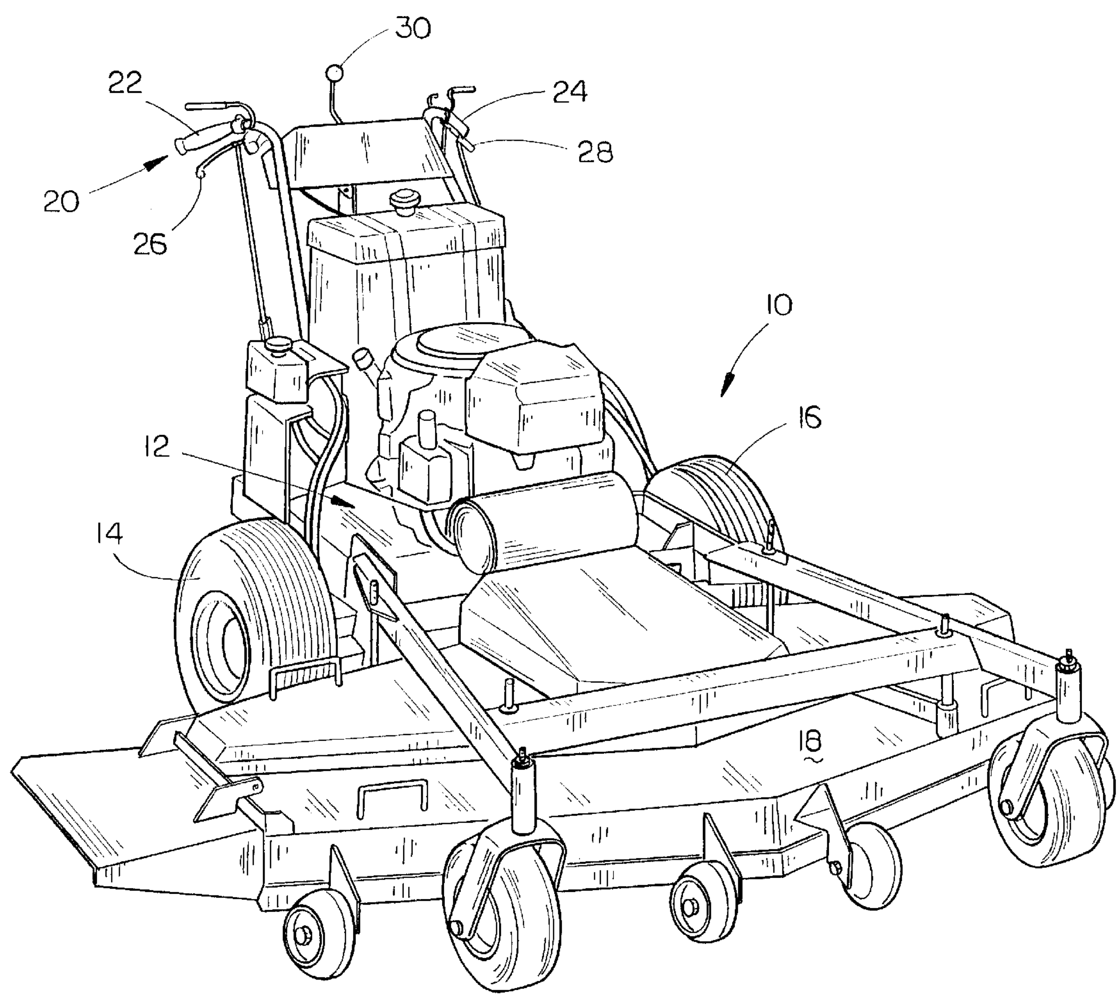
FIG. 1 is a front perspective view of a dual hydraulically powered, wheel-steered mower.
Figure 2:
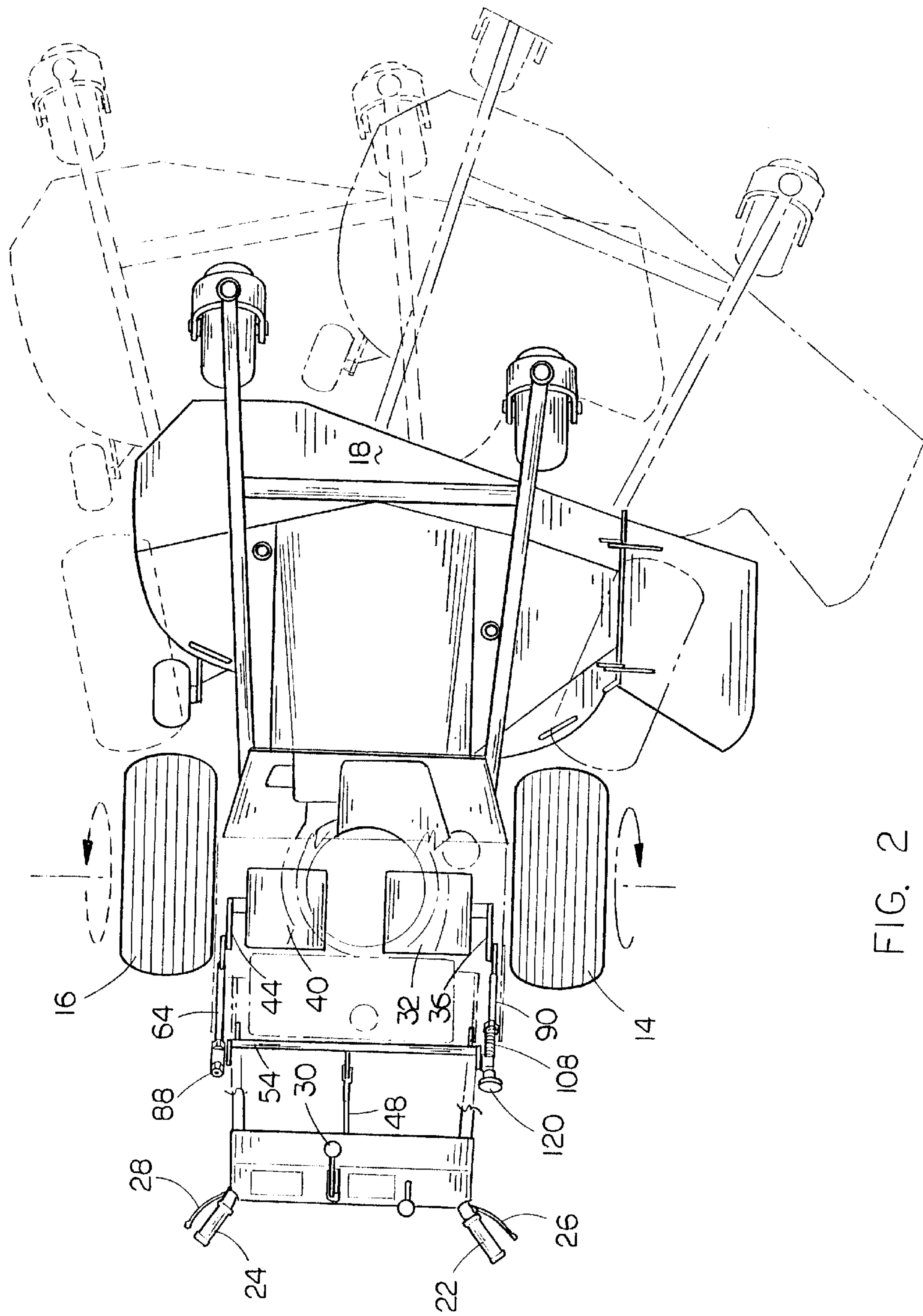
FIG. 2 is a top elevational view of the mower of FIG. 1.
Figure 3:
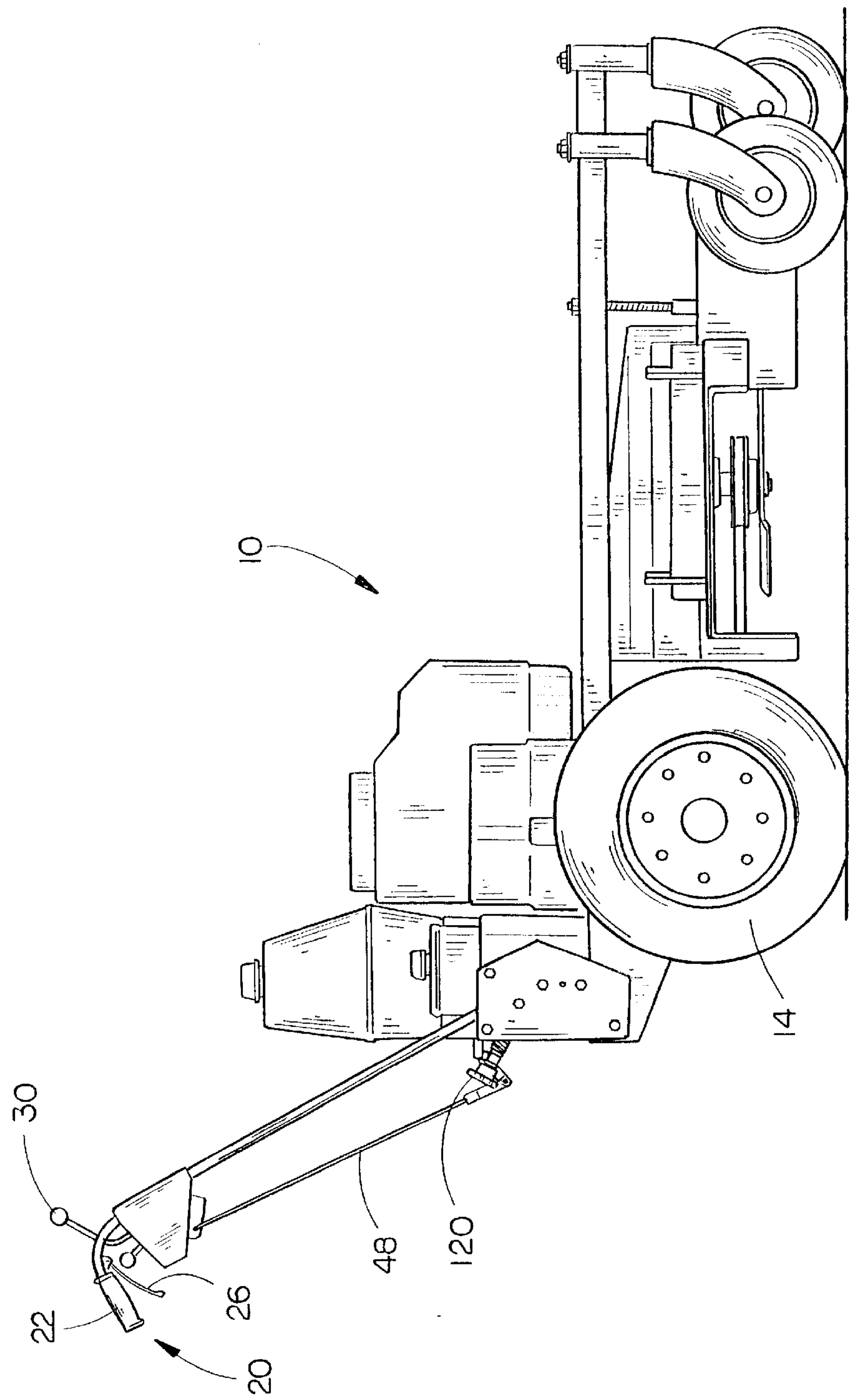
FIG. 3 is a side view of the mower of FIGS. 1 and 2.
Figure 4:
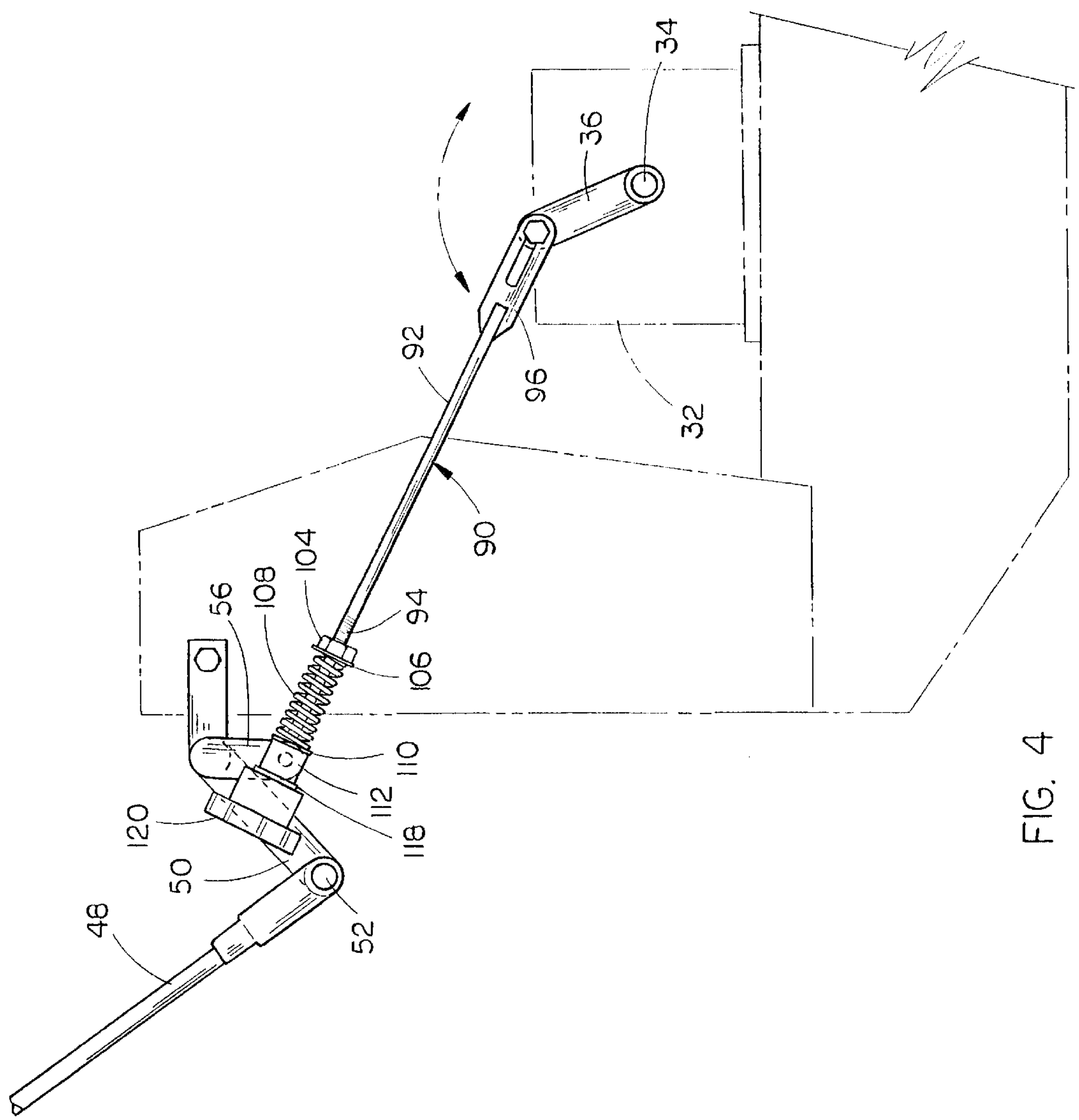
FIG. 4 is a side view of the means for adjusting the output of one of the hydraulic pumps, relative to the other pump, on the mower of FIGS. 1–3.

In the drawings, the reference numeral 10 generally refers to a lawn mower of the walk-behind type and which generally includes a frame means 12 having a right drive wheel 14 and a left drive wheel 16 mounted at the sides thereof which are used to steer and drive the mower in conventional fashion. Mower 10 includes a mower deck 18 having a plurality of cutting blades mounted therein for cutting grass.

A handlebar assembly 20 extends upwardly and rearwardly from the frame means 12 and has a pair of handle grips 22 and 24 mounted thereon including steering control levers 26 and 28 pivotally connected thereto to steer the drive wheels 14 and 16, respectively, in conventional fashion. Speed control lever 30 extends downwardly from the upper end of the handlebar assembly 20 as illustrated, and is selectively movable to provide a speed control for the hydraulic pumps as will be described hereinafter.

The numeral 32 refers to a right hydraulic pump having a control shaft 34 rotatably extending outwardly from one side thereof and which has a crank arm 36 mounted thereon. Right hydraulic pump 32 is operatively connected to a conventional hydraulic motor 38 (not shown) which is operatively connected to right drive wheel 14 for driving the same in either a forwardly or rearwardly direction.

The numeral 40 refers to a left hydraulic pump having a control shaft 42 (not shown) rotatably extending outwardly from one side thereof and having a crank arm 44 mounted thereon. Hydraulic pump 40 is operatively connected to a conventional hydraulic motor 46 (not shown) which is operatively connected to left drive wheel 16 for driving the same in either a forwardly or rearwardly manner. Usually, the steering control levers 26 and 28 are operatively connected to the crank arms 36 and 44, respectively, so that the crank arms 36 and 44 may be pivotally moved to cause the hydraulic pumps 32 and 40 to be operated to enable the associated hydraulic motors to be either operated in a forwardly or rearwardly direction.

Speed control lever 30 includes a length adjustable rod 48 which extends downwardly therefrom and which is pivotally connected to arm 50 by pin 52. Arm 50 is secured to crank arm 54, as seen in the drawings, which is pivotally mounted on the frame means 12 by any convenient means so that crank arm 54 may be selectively rotated about its longitudinal axis. Arms 56 and 58 extend transversely from the opposite ends of crank arm 54 and have openings 60 and 62 formed therein, respectively.

The numeral 64 refers generally to a control linkage which extends between crank arm 54 and crank arm 44. Control linkage 64 includes an elongated control rod 66 having an externally threaded portion 68 at its rearward end and a flat portion 70 at its lower end which has an elongated slot 72 formed therein. The lower end of control rod 66 is connected to crank arm 44 by means of bolt 74 extending through opening 76 formed in crank arm 44 and extending through slot 72. Lower jam nut 78 is threadably mounted on externally threaded portion 68 below swivel 80. Swivel 80 has an opening 82 formed therein and a transversely extending finger 84 which is received by opening 62 in arm 58. Pin or key 86 extends through opening 87 formed on the inner end of finger 84 to maintain swivel 80 in opening 62. Control rod 66 extends through opening 82 in swivel 80 and an upper jam nut 88 is threadably mounted on externally threaded portion 68 of control rod 64 above swivel 80.

The numeral 90 refers to a control linkage for controlling the pumping rate of the right hydraulic pump 32. Although it has been described that the control linkage 64 is connected to the left hydraulic pump 40 and the control linkage 90 is connected to the right hydraulic pump 32, the control linkages 64 and 90 could be reversed, if so desired, so that control linkage 64 is operatively connected to right hydraulic pump 32 and so that control linkage 90 is operatively connected to left hydraulic pump 40. Further, a control linkage such as 90 could be used on both sides of the mower, that is, connected to pumps 32 and 40. Additionally, although it is preferred that control linkage 64 be length adjustable through the use of jam nuts 78 and 88, a fixed length control linkage 64 could also be used.

Control linkage 90 includes an elongated control rod 92 having an externally threaded portion 94 at its upper end and a flat portion 96 at its lower end. Flat portion 96 is provided with an elongated slot 98 formed therein adapted to receive bolt 100 extending therethrough which is pivotally received by opening 102 formed in crank arm 36.

Figure 5:
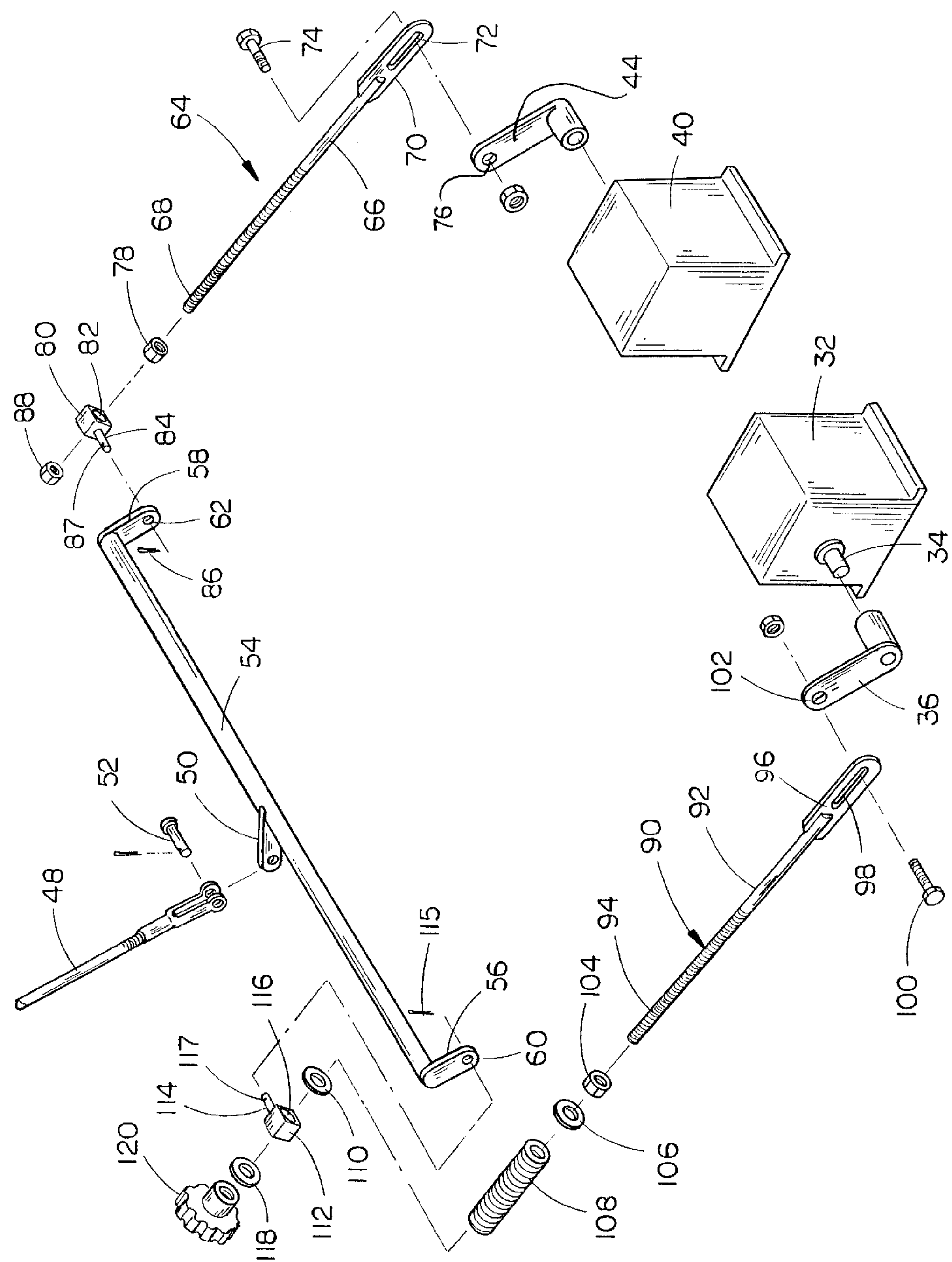
FIG. 5 is an exploded perspective view of the instant invention.

Nut 104 is threadably mounted on externally threaded portion 94 of control rod 92. Washer 106 is mounted on control rod 92 above nut 104, as seen in FIG. 5. The numeral 108 designates a compression spring which is received on control rod 92 above washer 106. Washer 110 is received on control rod 92 above the upper end of compression spring 108 and below swivel 112. Swivel 112 has a transversely extending finger 114 extending therefrom which is received by the opening 60 in arm 56 on crank arm 54, and which is maintained therein by a retaining pin or key 115 extending through opening 117 formed in the inner end of finger 114. Swivel 112 has an opening 116 formed therein which receives the control rod 94 extending therethrough. Washer 118 is positioned at the upper end of swivel 112. Adjustment knob 120 is threadably mounted on the upper end of control rod 94. It should be noted that washers 106, 110 and 118, although desirable, may be omitted from the assembly. Although it is preferred that an adjustment knob 120 be utilized, adjustment knob 120 could be replaced by other suitable means which would permit the length adjustment of the control rod 92, with respect to arm 56, without the use of tools.

The steering control levers 26 and 28 are normally operatively interconnected, through suitable linkages, to the lower ends of rods 66 and 92 or to the crank arms 36 and 44, respectively, so that the steering control levers 26 and 28 may be manipulated to drive the pumps 32 and 40 in either a forwardly or rearwardly fashion so that the drive wheels 14 and 16 will be operated in a forwardly or rearwardly direction. Additionally, one of the steering control levers 26 or 28 may be placed in a reverse position while the other steering control lever may be placed in a forward position so that the mower has a zero radius turn capability.

Initially, the steering control levers 26 and 28 will be positioned in their neutral positions with the mower frame means being raised so that the drive wheels 14 and 16 are out of ground engagement. The engine on the lawn mower is activated so that hydraulic pumps 32 and 40 are operated. If the left drive wheel should creep either forwardly or rearwardly, when the steering control lever 28 is in its neutral position, jam nuts 78 and 88 on control rod 66 are longitudinally moved thereon to achieve the proper neutral position of the hydraulic pump 40. At the same time, adjustment knob 120 is threadably moved with respect to control rod 92, in either a clockwise direction or a counter-clockwise direction, until the hydraulic pump 32 is in its proper neutral position.

After the initial adjustment described hereinabove, and it is desired to mow, the drive wheels 14 and 16 are obviously placed in ground engaging position and the speed control lever 30 is set in its desired position. Movement of speed control lever 30, and rod 48, causes control rods 66 and 92 to pivotally move crank arms 44 and 36, respectively, to either decrease the output rate of the hydraulic pumps or increase the output rate of the hydraulic pumps. When the steering control levers 26 and 28 are in their full forward position, the hydraulic pumps 32 and 40 desirably have the same output rate so that the drive wheels 14 and 16 will be driven at the same rotational rate so that the mower will move forward in a straight line condition. However, if one of the drive wheels has a smaller diameter than the other drive wheel, through the loss of air pressure or the like, the mower will not move ahead in a straight line condition. If such is the case, adjustment knob 120 is rotatably moved with respect to control rod 92 to longitudinally move control rod 92 with respect to hydraulic pump 32. As the control linkage 90 is shortened or lengthened, the hydraulic control shaft 34 is rotated slightly, thereby adjusting the output of hydraulic pump 32. The output of hydraulic pump 32 may be adjusted until hydraulic pumps 32 and 40 have the proper balance of output to cause the vehicle to track as desired.

In operation, the nut 104 compresses the spring 108 which clamps the entire assembly with enough tension to hold the location of the swivel 114 against the base of the knob 120. Once the assembly is compressed, the knob 120 will not rotate freely, but may be rotated by the operator to shorten or lengthen control linkage 90 by sliding the swivel along the control rod 92 as the knob 120 is rotated.

The knob 120 may be rotated by the operator of the mower while the mower is being moved, without tools. Once the adjustment has been made, the mower may be stopped, started and varied in speed without losing the adjustment in control linkage 90.

Thus it can be seen that a novel apparatus has been provided which accomplishes at least all of its stated objectives.

I claim:

1. A walk-behind, self-propelled lawn mower, comprising:

a frame means having a rearward end, a forward end, a right side, and a left side;

grass cutting means on said frame means;

a power source on said frame means;

a right drive wheel at said right side of said frame means;

a left drive wheel at said left side of said frame means;

a right hydraulic motor connected to said right drive wheel for driving said right drive wheel;

a left hydraulic motor connected to said left drive wheel for driving said left drive wheel;

a right hydraulic pump fluidly connected to said right hydraulic motor for driving the same;

a left hydraulic pump fluidly connected to said left hydraulic motor for driving the same;

a right hydraulic pump control means connected to said right hydraulic pump for changing the pumping rate of said right hydraulic pump;

a left hydraulic pump control means connected to said left hydraulic pump for changing the pumping rate of said left hydraulic pump;

said power source being connected to said grass cutting means and said right and left hydraulic pumps for driving the same;

connection means interconnecting said right and left hydraulic pump control means;

said connection means being movable in a first direction whereby the pumping rate of both of said right and left hydraulic pumps will be increased the same amount;

said connection means also being movable in a second direction whereby the pumping rates of both of said right and left hydraulic pumps will be decreased the same amount;

a speed control lever connected to said connection means for moving said connection means in said first and second directions;

at least one of said right and left hydraulic pump control means having adjustment means thereon for infinitely adjusting the tracking of the mower by adjusting the output of the hydraulic pump associated with said one hydraulic pump control means, with respect to the output of the hydraulic pump associated with the other hydraulic pump control means, without bringing the mower to a halt;

said right and left hydraulic pump control means having adjustment means thereon for adjusting the tracking of the mower;

each of said left and right hydraulic pumps having a rotatable control shaft extending therefrom, said connection means comprising a rotatable crank arm having right and left ends, a right arm extending transversely from said right end of said crank arm, a left arm extending transversely from said left end of said crank arm; said left hydraulic pump control means comprising an elongated left control rod having rearward and forward ends, said left control rod having a threaded portion, said forward end of said left control rod operatively secured to the said control shaft on said left hydraulic pump; the rearward end of said left control rod having a left swivel connector mounted thereon which is connected to said left arm on said crank arm; a first jam nut threadably mounted on said left control rod forwardly of said left swivel connector, and a second jam nut threadably mounted on said left control rod rearwardly of said left swivel connector, said first and second jam nuts selectively maintaining said left swivel connector in a predetermined position on said left control rod.

2. The lawn mower of claim 1 wherein said right hydraulic pump control means comprises an elongated, right control rod having rearward and forward ends, said forward end of said right control rod operatively secured to the said control shaft on said right hydraulic pump; said right control rod having a threaded portion thereon, a front jam nut threadably mounted on the right control rod rearwardly of the forward end thereof, a right swivel connector mounted on said right control rod rearwardly of said front jam nut which is connected to said right arm on said crank arm, and an adjustment knob means threadably mounted on said right control rod, rearwardly of said right swivel connector, for selectively longitudinally moving said right control rod rearwardly, with respect to said right swivel connector, and for selectively longitudinally moving said right control rod forwardly, with respect to said right swivel connector.

3. The lawn mower of claim 2 wherein a holding means is mounted on said right control rod rearwardly of said first jam nut.

4. The lawn mower of claim 3 wherein said holding means comprises a compression spring means.

5. A walk-behind, self-propelled lawn mower, comprising:

a frame means having a rearward end, a forward end, a right side, and a left side;

grass cutting means on said frame means;

a power source on said frame means;

a right drive wheel at said right side of said frame means;

a left drive wheel at said left side of said frame means;

a right hydraulic motor connected to said right drive wheel for driving said right drive wheel;

a left hydraulic motor connected to said left drive wheel for driving said left drive wheel;

a right hydraulic pump fluidly connected to said right hydraulic motor for driving the same;

a left hydraulic pump fluidly connected to said left hydraulic motor for driving the same;

said right hydraulic pump having a rotatable control shaft extending therefrom which is selectively rotatable to change the pumping rate of said right hydraulic pump;

said control shaft on said right hydraulic pump having a crank arm secured thereto;

said left hydraulic pump having a rotatable control shaft extending therefrom which is selectively rotatable to change the pumping rate of said left hydraulic pump;

said control shaft on said left hydraulic pump having a crank arm secured thereto;

a right steering lever operatively connected to said crank arm on said right hydraulic pump;

a left steering lever operatively connected to said crank arm on said left hydraulic pump;

said power source being connected to said grass cutting means and said right and left hydraulic pumps for driving the same;

connection means interconnecting said crank arms on said right and left hydraulic pumps;

said connection means being movable in a first direction whereby the pumping rate of both of said right and left hydraulic pumps will be increased the same amount;

said connection means also being movable in a second direction whereby the pumping rates of both of said right and left hydraulic pumps will be decreased the same amount;

a speed control lever connected to said connection means for moving said connection means in said first and second directions;

said connection means having adjustment means thereon for infinitely adjusting the tracking of the mower by adjusting the output of one of said right and left hydraulic pumps, with respect to the output of the other hydraulic pump, without bringing the mower to a halt.

6. The lawn mower of claim 5 wherein said connection means includes adjustment means thereon for adjusting both of said right and left hydraulic pumps for adjusting the tracking of the mower.

7. A walk-behind, self-propelled lawn mower, comprising:

a frame means having a rearward end, a forward end, a right side, and a left side;

grass cutting means on said frame means;

a power source on said frame means;

a right drive wheel at said right side of said frame means;

a left drive wheel at said left side of said frame means;

a right hydraulic motor connected to said right drive wheel for driving said right drive wheel;

a left hydraulic motor connected to said left drive wheel for driving said left drive wheel;

a right hydraulic pump fluidly connected to said right hydraulic motor for driving the same;

a left hydraulic pump fluidly connected to said left hydraulic motor for driving the same;

said right hydraulic pump having a rotatable control shaft extending therefrom which is selectively rotatable to change the pumping rate of said right hydraulic pump;

said control shaft on said right hydraulic pump having a crank arm secured thereto;

said left hydraulic pump having a rotatable control shaft extending therefrom which is selectively rotatable to change the pumping rate of said left hydraulic pump;

said control shaft on said left hydraulic pump having a crank arm secured thereto;

a right steering lever operatively connected to said crank arm on said right hydraulic pump;

a left steering lever operatively connected to said crank arm on said left hydraulic pump;

said power source being connected to said grass cutting means and said right and left hydraulic pumps for driving the same;

connection means interconnecting said crank arms on said right and left hydraulic pumps;

said connection means being movable in a first direction whereby the pumping rate of both of said right and left hydraulic pumps will be increased the same amount;

said connection means also being movable in a second direction whereby the pumping rates of both of said right and left hydraulic pumps will be decreased the same amount;

a speed control lever connected to said connection means for moving said connection means in said first and second directions;

said connection means including adjustment means for infinitely adjusting the tracking of the mower by adjusting the output of at least one of said right and left hydraulic pumps.

* * * * *